Figure 1:
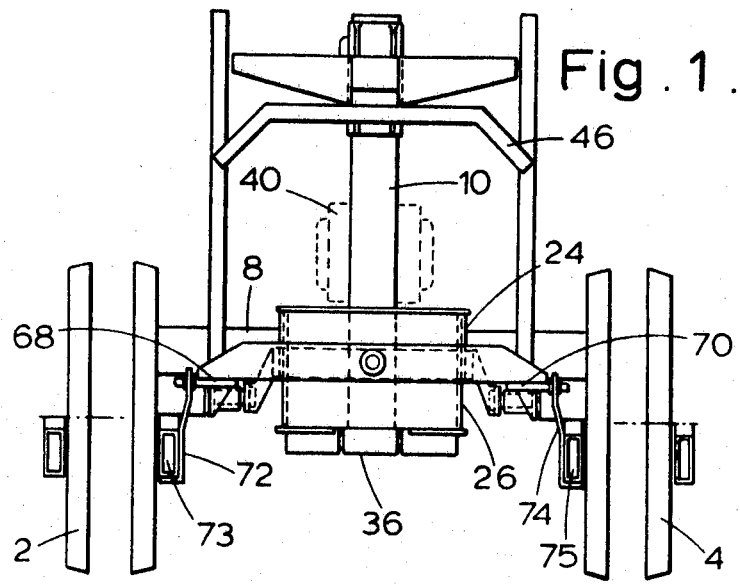

United States Patent [19]
Kasin et al.

[11] 3,741,526
[45] June 26, 1973

[54] LOADING AND CONVEYING DEVICE TO BE MOUNTED ON A TRACTOR OR THE LIKE

[75] Inventors: Hans Kasin; Odd Krane Thvedt, both of Notodden, Norway

[73] Assignee: Christiania Spigerverk, Division JoBU

[22] Filed: June 1, 1971

[21] Appl. No.: 148,812

[52] U.S. Cl........... 254/139.1, 214/85.5, 214/130 R
[51] Int. Cl............................................. B66c 26/30
[58] Field of Search..................... 214/523, 77, 85.5, 214/147 G; 254/139.1; 212/8, 9

[56] References Cited
UNITED STATES PATENTS

| | | | |
|---|---|---|---|
| 3,362,550 | 1/1968 | Kappler | 254/139.1 X |
| 1,909,689 | 5/1933 | Kuchar | 214/523 |
| 2,382,054 | 8/1945 | Hercik | 254/139.1 |
| 3,477,596 | 11/1969 | Michaelson et al. | 354/139.1 X |

FOREIGN PATENTS OR APPLICATIONS

| | | | |
|---|---|---|---|
| 97,632 | 1/1961 | Norway | 214/85.5 |
| 848,995 | 7/1949 | Germany | 254/139.1 |

Primary Examiner—Albert J. Makay
Attorney—Wenderoth, Lind & Ponack

[57] ABSTRACT

A loading and conveying device for timber logs and the like to be mounted on a motor vehicle. The device comprises an upright mast with a rearwardly directed cantilevered loading beam provided with means for hoisting and carrying the fore end of the load, such as a bundle of timber logs or the like, the rear end of which rests on the ground. The cantilevered beam is at the rear end provided with a transverse yoke member adapted to rest against and partly around the bundle. The winch equipment includes a hoisting strap depending from a point on the cantilevered beam positioned closer to the mast proper. The mast is in its mounting on the tractor body pivotally supported about a horizontal as well as about a vertical axis.

6 Claims, 4 Drawing Figures

PATENTED JUN 26 1973 3,741,526

SHEET 1 OF 2

HANS KASIN and
ODD KRANE THVEDT,
INVENTORs

BY Wenderoth, Lind & Ponack

ATTORNEYS

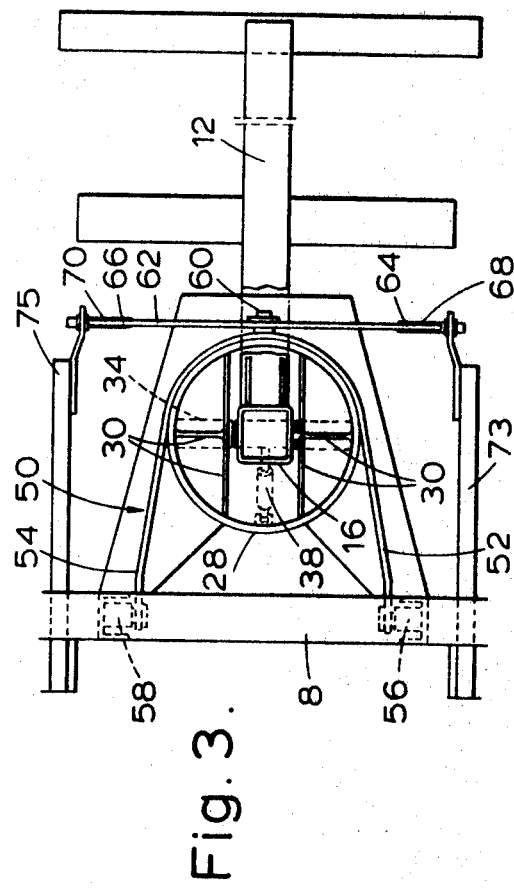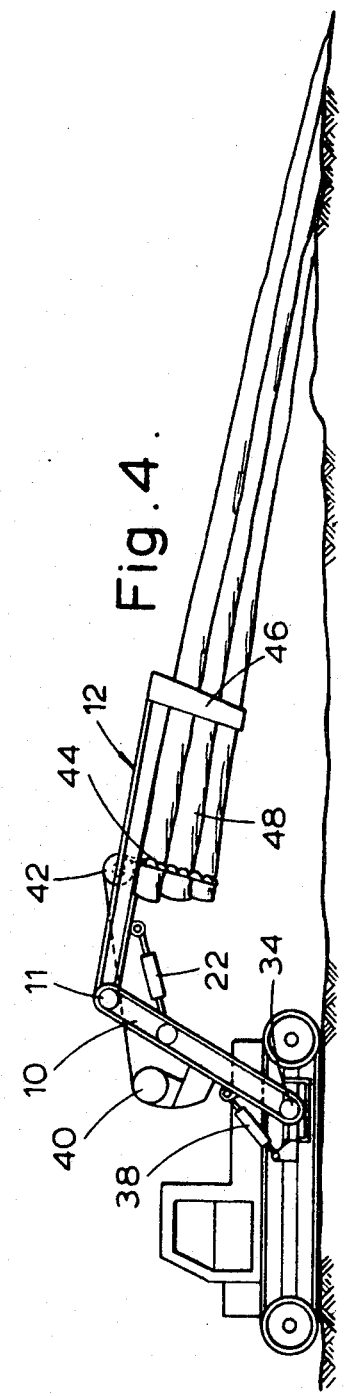

LOADING AND CONVEYING DEVICE TO BE MOUNTED ON A TRACTOR OR THE LIKE

The present invention relates to a novel arrangement for a loading and conveying device to be mounted on a tractor or the like, particularly on a forest tractor for loading and transporting timber logs.

The principal object of the invention is to provide an improved loading and carrying device which when carrying a timber load reduces or hampers the driving characteristics of the tractor and the transport unit as little as possible, particularly when the transport takes place through rough terrain.

A further object of the invention is to provide an improved loading and conveying device which simplifies the loading of a timer load.

A special object of the invention is to provide a loading and conveying device for timber logs which eliminates or reduces the risk of the tractor tilting over or capsizing during driving.

PRIOR ART

A loading and conveying device in accordance with the invention is more particularly of the type which comprises a mast mounted upright on a tractor and having a rearwardly pointing cantilevered member provided with winch equipment including a strap or the like to be strapped around the load in order to hoist the same up from the ground such that the rear end section of the load rests on the ground and is dragged along the ground when transported by the tractor.

In known loading and conveying devices of this kind the mast is in some designs pivotally supported on the tractor in a horizontal plane. The cantilevered member may be pivotally connected to the mast and equipped to be utilized as a crane boom.

Such a loading and conveying device usually to a large degree impedes the driving characteristics of the tractor when the same carries a timber load and the transport operation may be dangerous since the tractor including the load may tilt over or capsize, particularly when operating in rough terrain.

THE INVENTION

The concept of the present invention rests in the principal idea to utilize the contact which exists between the rear end portion of the timber load and the ground to stabilize the tractor and thus the entire transport unit.

This concept is realized through the invention by providing the upright mast including the cantilevered member as a completely rigid unit and mounting this unit in a pivotal support on the tractor such that the mast may pivot about a vertical as well as about a horizontal axis in this support, the cantilevered beam at the rear end provided with a yoke-like member in a per se known fashion adapted to come into rest against the timber load, the winch equipment including the hoisting strap arranged at a forwardly spaced point on the beam such that the yoke-like member is pressed against the timber load when the fore end of same is hoisted up by the winch equipment. The beforementioned design and loading principle result in that no moments will be transferred to the tractor from the loading device since the mast may pivot both horizontally and vertically at the mounting point on the tractor. This will be the case also when the tractor transports the timber load through rough terrain since the mast with its cantilevered beam and including the timber load will constitute a rigid unit which is supported on two points, namely via the mast on the tractor and via the contact of the rear end of the load with the ground.

This situation will exist also when the tractor seen in a plane view is directed at an angle relative to the timber load. A tractor provided with a loading and conveying device in accordance with the invention will consequently not possess any tendency to capsize or tilt during driving since to bending moments are transferred from the loading device to the tractor.

PREFERRED EMBODIMENTS

In a preferred embodiment of the invention the mast and the cantilevered beam are pivotally interconnected at their meeting ends about a horizontal axis, and the angle between the mast and the cantilevered beam is adjustable, preferably by means of a hydraulic cylinder connected therebetween.

Figure 2:
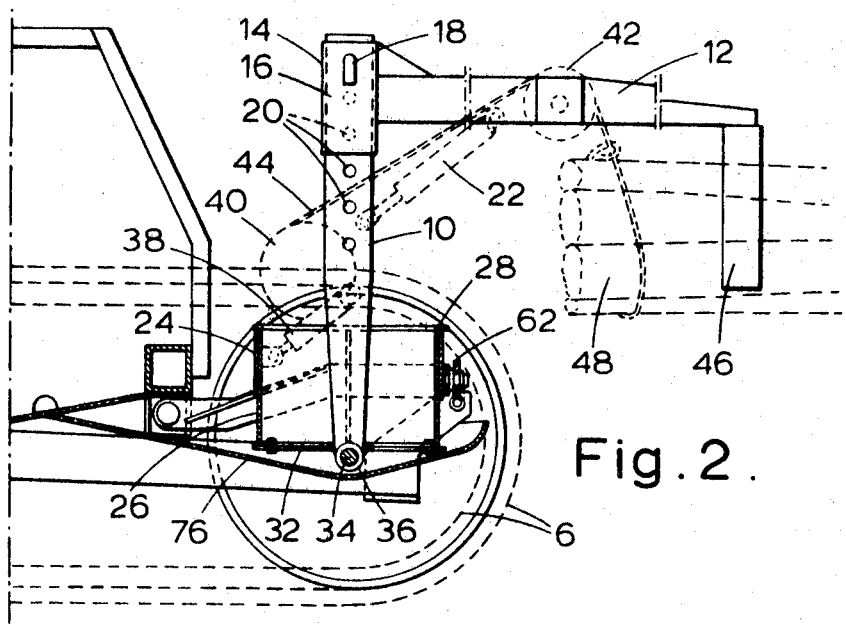

The construction and the mode of operation for the loading device in accordance with the invention will be better understood when the invention is described in connection with the attached drawings showing two embodiments for a loading device in accordance with the invention, and wherein:

FIG. 1 shows a lateral view of the rear end of a tractor including the loading device, FIG. 2 shows schematically a lateral view of the tractor including the loading device, partly shown in section and with parts of the tractor and the device removed for the sake of clarity, FIG. 3 shows a plane view of the mounting of the loading device and the suspension of the tractor, and FIG. 4 shows a forest tractor with a loading device in accordance with the invention when transporting a timber load.

In the drawings the reference numbers 2 and 4 designate the rear wheels in the belt bogie suspension for the tractor, the dashed lines 6 indicating the belts. The tractor chassis is designated with the number 8.

The loading device comprises, as best shown in FIG. 2, an upright mast 10 including a rearwardly directed cantilevered beam 12. The mast and the cantilevered beam are rigidly interconnected or must in any case be rigidly coupled together. In the illustrated embodiment (shown in full lines), the cantilevered beam is provided with a square or box-shaped bushing 16, which is displaceably positioned on the corresponding configured mast, such that the cantilevered beam may be adjusted vertically on the mast and be fixed with a locking bolt 18 which can be put through the assembly through the desired one of a number of lock holes 20.

In an alternative embodiment the cantilevered beam 12 is pivotally supported on the mast about a horizontal axis, and between the mast and the cantilevered beam is coupled a hydraulic cylinder 22, shown in dashed lines.

In the illustrated embodiment a support ring 24 is mounted in the tractor chassis by means of a bracket device 50, comprising two axis-symmetrically arranged arms 52, 54, the fore end of which are mounted on the chassis via bolts 56, 58. The rearmost center point of the ring 24 is bolted at 60 to a transfer member 62, the extremities 64, 66 of which are journalled in bushings 68, 70, respectively, pivotally suspended in brackets 72, 74 fixed to the pivotable belt bogies 73, 75. This suspension constitutes no part of the invention.

The mast is pivotally supported in the ring 24 by means of an internally positioned complimentary ring 26 which is mounted to the mast 10. The ring 26 is along the upper edge provided with annular flange 28 which rests slidably against the edge of the outer ring 24 and thereby provides a trust bearing. The ring 26 is provided with internal transverse members 30, to which are mounted a support pivot 34 for a journal bushing 36 fixed to the lower end of the mast 10. Between the mast 10 and the ring 26 is furthermore arranged stay means such that the mast 10 may be maintained in an upright position as shown. This stay means comprises preferably a hydraulic cylinder 38, and furthermore a rigid stay member as an auxiliar support means (not shown). It will be understood that the mast 10 including the cantilevered beam 12 may pivot in the horizontal plane (via the rings 24 and 26) and in a vertical plane (about the pivot 34) in various angular positions.

On the mast 10 is furthermore mounted a winch 40, preferably a hydraulic winch, and on the fore part of the cantilevered beam 12 is positioned a block 42 to guide a hoisting and loading wire strap 44, which runs from the winch to the block 42 and from there downwards in order to be put around a timber load 48.

At the rear end of the cantilevered beam 12 is mounted a transverse yoke-like member 46 adapted to be brought against and partly around the timber load 48 as indicated with dashed lines.

In order to protect the entire suspension as above described is on the underside of the tractor chassis provided a shield 76 (see FIG. 2).

FIG. 4 illustrates schematically a tractor with a loading device in accordance with the invention when carrying a timber load. The mast 10 and the cantilevered beam 12 are here pivotally connected at 11 and the angular position therebetween may be controlled by means of the interconnected hydraulic cylinder 22. Between the mast 10 and the turnable ring support is likewise coupled the beforementioned hydraulic cylinder 38. The support journal for the mast on the tractor chassis is as shown positioned somewhat ahead of the rearmost support point for the belt 6 on the tractor 50.

The mode of operation for a loading device in accordance with the invention shall be described with reference to the assembly.

MODE OF OPERATION

One assumes that the timber load 48 is not yet loaded but lying on the ground as a stable. The loading wire 44 (or a separate chain strap) is put around the fore end section of the stable of logs and is hooked together, whereafter the winch is actuated with the result that the load is bunched firmly together and hoisted up. During this operation the yoke 46 will normally rest against and be pressed against the timber load, such that the load together with the cantilevered beam will form a more or less rigid unit, particularly downwardly and laterally. The cylinder 38 is put in neutral position such that the mast 10 may pivot about the pivot 34. The mast 10 including the cantilevered beam will during the hoisting and loading operation of the load be raised by the lever action from the logs and arrive to a position where it extends along and parallel with the log such as shown simultaneously as the log will press against the transverse yoke 46, the rear end of the load resting against the ground as shown. During the loading operation the hydraulic cylinder 38 is utilized only for guiding the mast including the cantilevered beam such that the yoke is brought into rest on the load, and the cylinder 38 is in neutral position (the cylinder 22 may be extended or contracted freely). When the tractor is driven without a load, the mast including the cantilevered beam is usually kept in upright position by means of the cylinders 38 and 22.

It is furthermore possible, however, by mean of the cylinder 38 to retain the cantilevered beam in position at any desired level above the stable during the bunching and loading thereof. This may in several cases be practical in order to arrange the various logs in the stable. During driving with a load it is however necessary, and this is the importance of the invention, that the mast including the load may pivot freely about the shaft or axis 34 and the cylinder 38 must, as previously mentioned, be put into a neutral position (preferably being emptied for hydraulic liquid). The hydraulic cylinder 22 interconnected between the mast and the cantilevered beam is usually in locked position in order to function as a rigid stay therebetween, but is preferably adjustable, since thereby the loading device may also be utilized as a hoisting crane, for instance for handling separate logs in order to assemble together a suitably sized heap or stable of logs to be loaded and transported by the tractor.

It will be understood that during driving with a load the mast and the load should together be pivotable in a vertical plane and in a horizontal plane relative to the tractor, but importantly, the mast cannot pivot laterally alone since it is arrested against lateral movements by the timber load which rests against the ground. This suspending and supporting system of the timber load implies that one obtains a very stable and safe transport of the timber load, even though the tractor travels through very rough forest terrain.

Only neglibile bending moments are transferred to the tractor. This is so because the mast is turnably supported on the tractor chassis at the bottom of the mast in the way as described and shown. In a loading device in accordance with the invention the force transferred from the loading device will present itself as a vertically extending force component going through the pivot axis 34 for the mast. Thereby one avoids the risk of the tractor tilting or capsizing.

If the tractor including a timber load travels through very rugged terrain, the hydraulic cylinders 38 and 22 may be utilized in order to steer and direct the tractor including the load. For example, if the tractor passes a relatively wide and deep ditch or the like, the size of which normally would imply that the tractor would dig down into the ditch, then the mast 10 during the passing of the ditch should be locked by the driver by means of the hydraulic cylinder 38, whereby the tractor will pass straight over the ditch being kept in a horizontal position by the timber load. When the tractor safely has passed the ditch, the cylinder 38 should immediately be put in neutral position.

It will be understood that one may, within the scope of the invention, design several modified embodiments. Thus the mast including the cantilevered beam may be given various shapes, the mast including the cantilevered beam may for instance be designed as one integral rigid unit in the shape of an arched, rearwardly pointing gallow.

What is claimed is:

1. A system for mounting on a tractor and for loading and conveying long, heavy loads, such as timber logs, said system comprising:

a mast having a lower end and an upper end;

means for mounting said lower end of said mast on said tractor for horizontal and vertical pivotal movement with respect thereto;

a cantilever beam having a forward end and a rearward end, said forward end mounted to said upper end of said mast and said rearward end extending rearwardly thereof;

winch means mounted below said upper end of said mast and having cable means for hoisting the forward end of said load, the rearward end of said load resting on the ground;

means mounted adjacent said forward end of said cantilever beam for supporting said cable, said cable extending from said winch and then downwardly therefrom;

transverse yoke means mounted on said rearward end of said cantilever beam for providing a first contact area between said load and said cantilever beam when said load is hoisted;

means attached to the end of said cable means for attachment to said forward end of said load and for causing said load to rigidly contact a second contact area between said load and said cantilever beam when said load is hoisted, said cantilever beam and said load forming a rigid unit when said load is hoisted into contact with said first and second contact areas;

means interconnecting said forward end of said cantilever beam and said upper end of said mast for forming a rigid joint therebetween when said load is hoisted and conveyed; and means interconnecting said mast and said means for mounting said mast for allowing vertical pivotal movement of said mast when said mast, said cantilever beam and said load form a rigid unit during conveying of said load.

2. A system as claimed in claim 1, wherein said winch means is mounted on said mast.

3. A system as claimed in claim 1, wherein said means for forming a rigid joint comprises a bushing fixing said cantilever beam to said mast at a single fixed angle.

4. A system as claimed in claim 1, wherein said means for forming a rigid joint comprises an adjustable stay having means for selectively pivotally adjusting the angle between said cantilever beam and said mast.

5. A system as claimed in claim 1, wherein said means for mounting said mast for horizontal movement comprises an annular member supporting said mast and pivotally supportable on said tractor.

6. A system as claimed in claim 5, wherein said means interconnecting said mast and said means for mounting said mast comprises a fluid cylinder coupled between said lower part of said mast and a peripheral portion of said annular member, said fluid cylinder being selectively adjustable from a free moving position to allow said vertical pivotal movement to a rigid position to prevent said vertical pivotal movement.

* * * * *